(No Model.) 7 Sheets—Sheet 1.

D. G. WEEMS.
ELECTRIC RAILWAY.

No. 406,804. Patented July 9, 1889.

WITNESSES:

INVENTOR

BY
A. H. Evans & Co.
ATTORNEYS (No Model.)  
7 Sheets—Sheet 2.
D. G. WEEMS.
ELECTRIC RAILWAY.
No. 406,804.  Patented July 9, 1889.
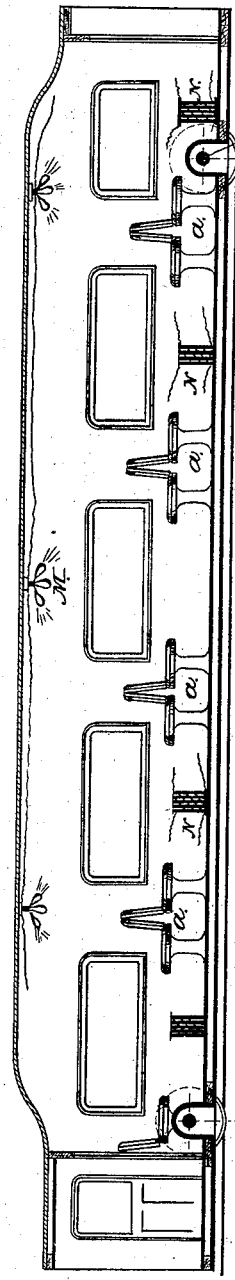
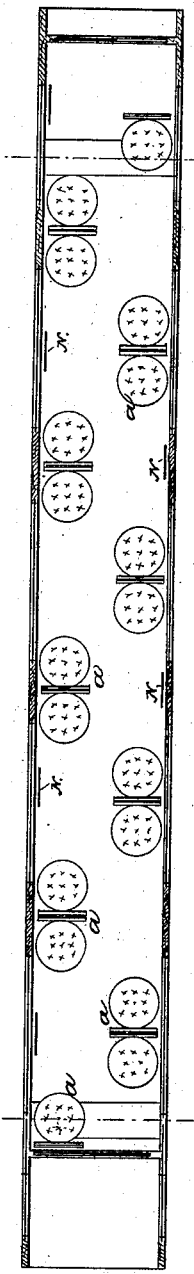
WITNESSES:
INVENTOR
BY
ATTORNEYS

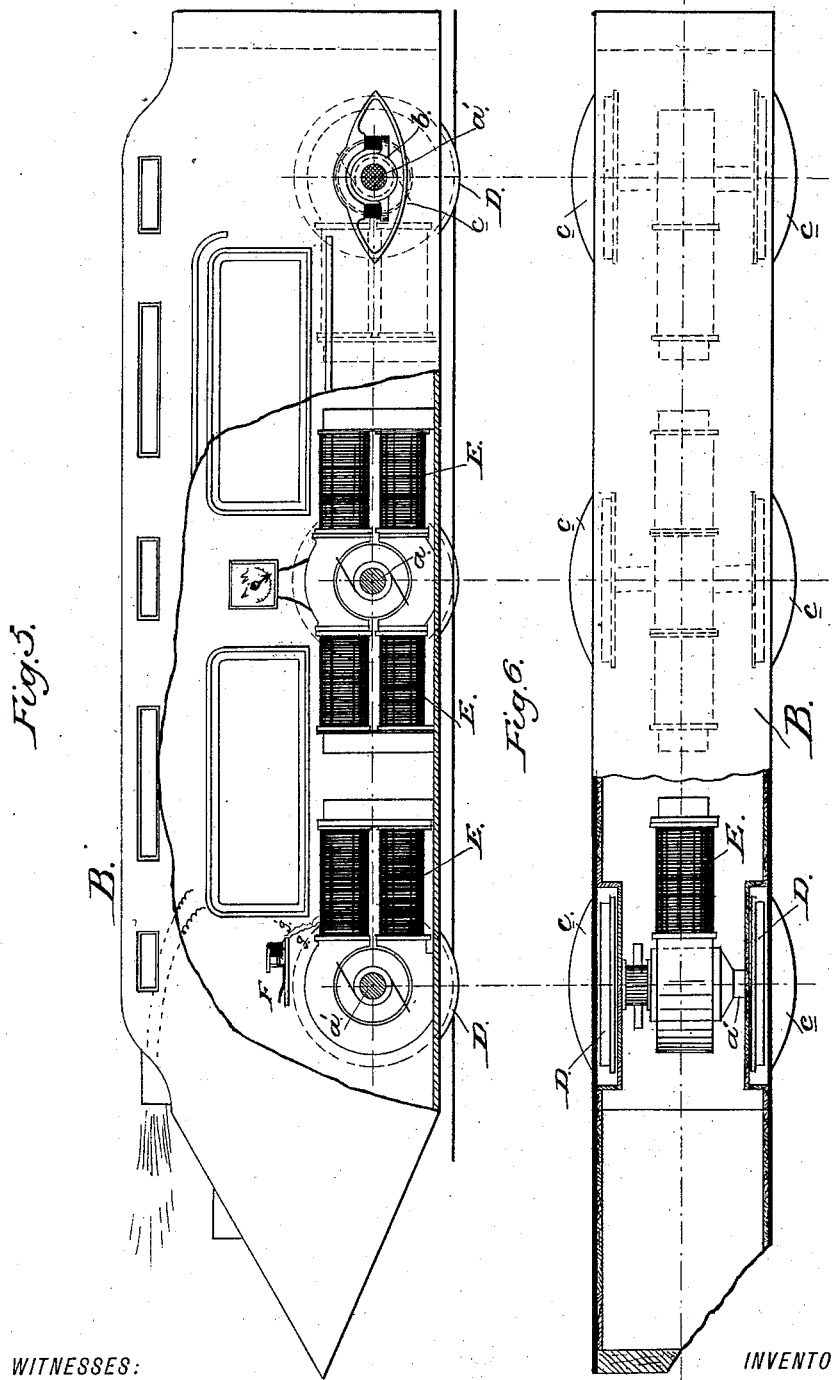

(No Model.) 7 Sheets—Sheet 4.
D. G. WEEMS.
ELECTRIC RAILWAY.
No. 406,804. Patented July 9, 1889.
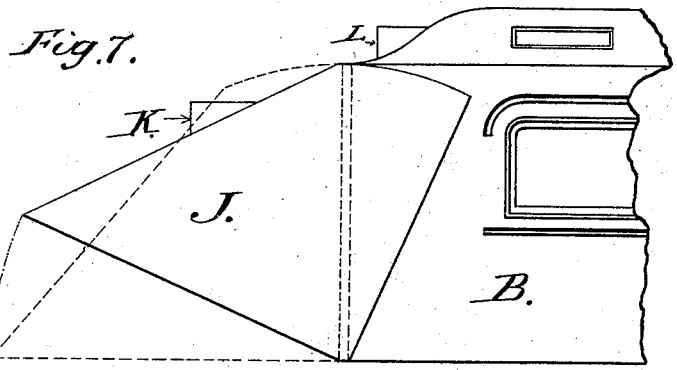
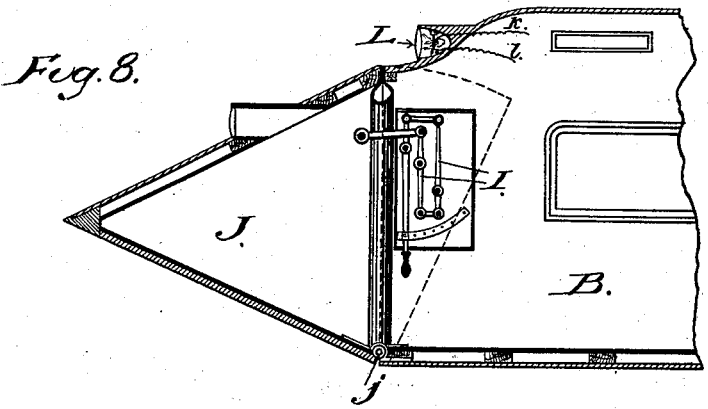
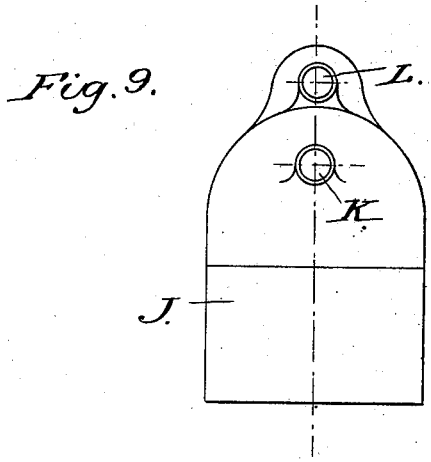
WITNESSES:
INVENTOR
ATTORNEYS (No Model.) 7 Sheets—Sheet 5.

D. G. WEEMS.
ELECTRIC RAILWAY.

No. 406,804. Patented July 9, 1889.

WITNESSES:
Wm. W. Pigram.
Benj. J. Dashiell Jr.

INVENTOR
David G. Weems
BY
A. H. Evans & Co.
ATTORNEYS (No Model.) 7 Sheets—Sheet 6.
D. G. WEEMS.
ELECTRIC RAILWAY.
No. 406,804. Patented July 9, 1889.
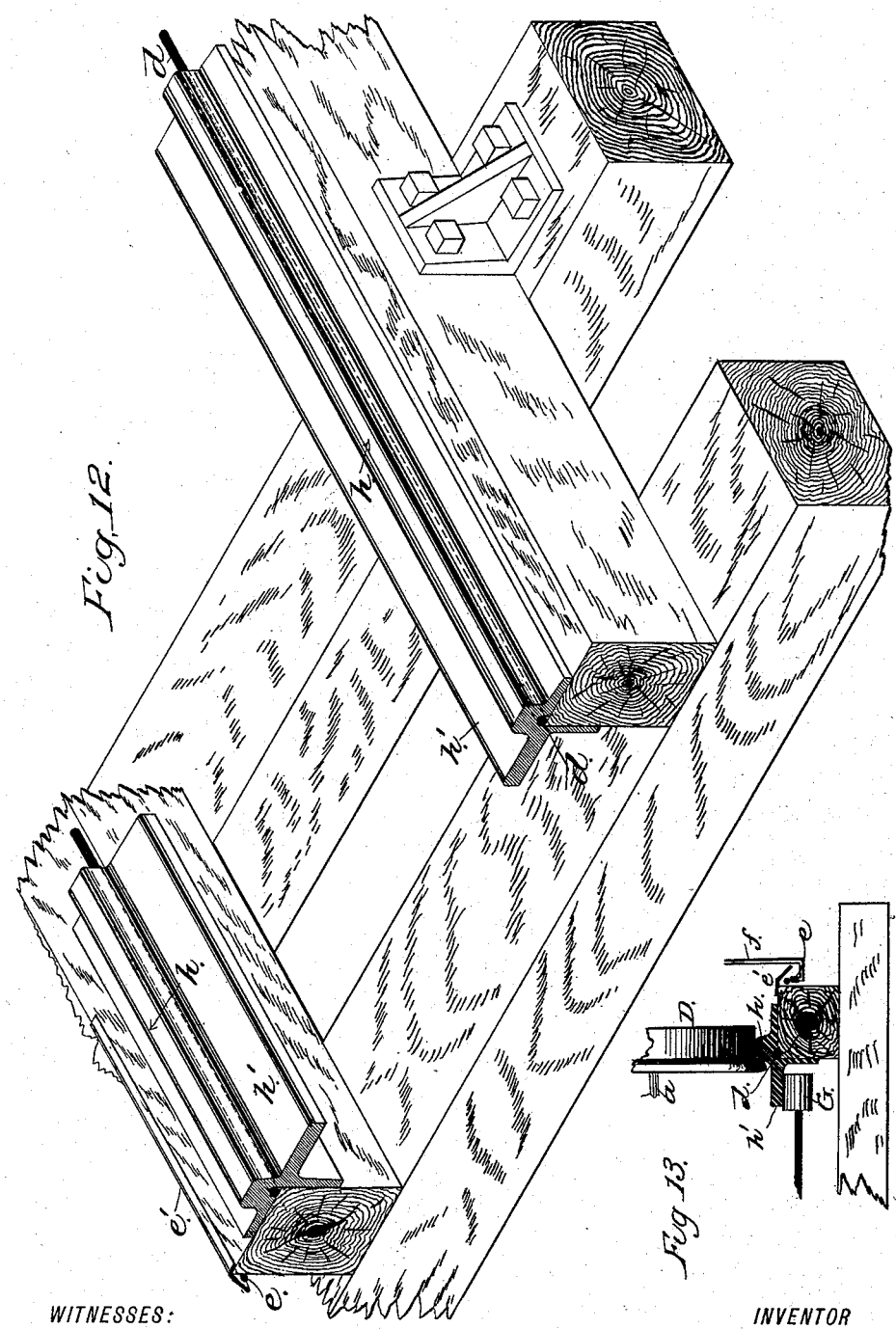
WITNESSES:
INVENTOR
BY
ATTORNEY (No Model.)
D. G. WEEMS.
ELECTRIC RAILWAY.
No. 406,804.
7 Sheets—Sheet 7.
Patented July 9, 1889.
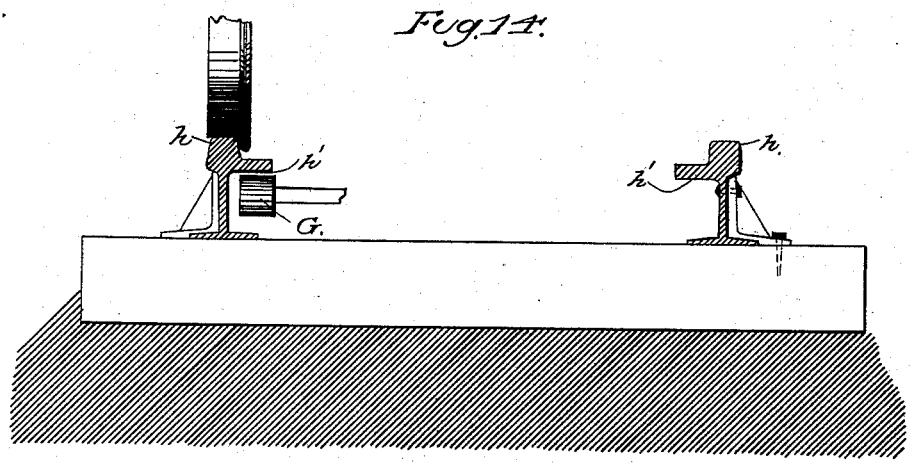
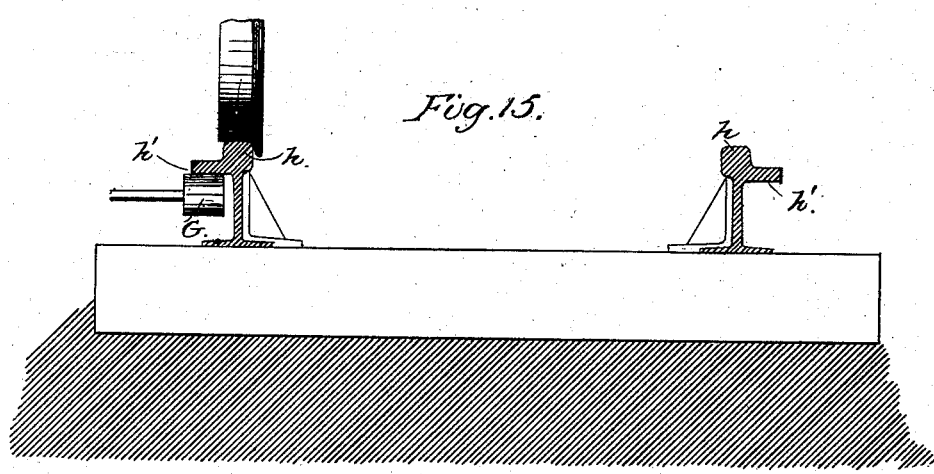
WITNESSES:
INVENTOR

UNITED STATES PATENT OFFICE.

DAVID G. WEEMS, OF BALTIMORE, MARYLAND, ASSIGNOR TO THE ELECTRO-AUTOMATIC TRANSIT COMPANY, OF SAME PLACE.

ELECTRIC RAILWAY.

SPECIFICATION forming part of Letters Patent No. 406,804, dated July 9, 1889.

Application filed February 2, 1889. Serial No. 298,535. (No model.)

*To all whom it may concern:*

Be it known that I, DAVID G. WEEMS, a citizen of the United States, residing at Baltimore city, State of Maryland, have invented certain new and useful Improvements in Electric Railways, of which the following is a full and clear description, reference being had to the accompanying drawings, forming part of this specification, in which—

Figure 1:
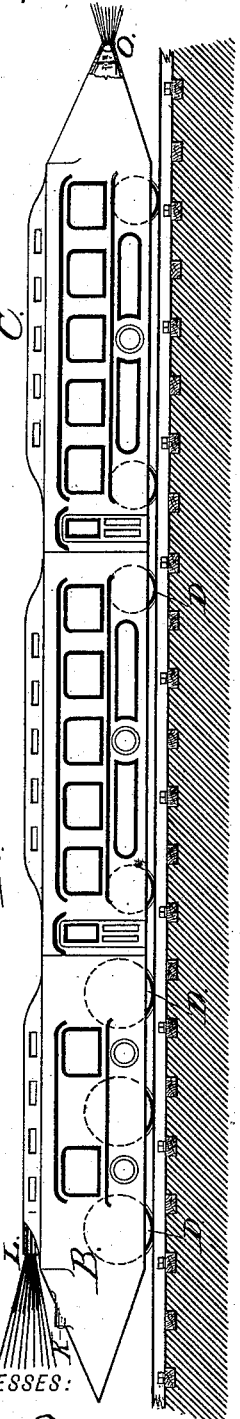
Figure 2:
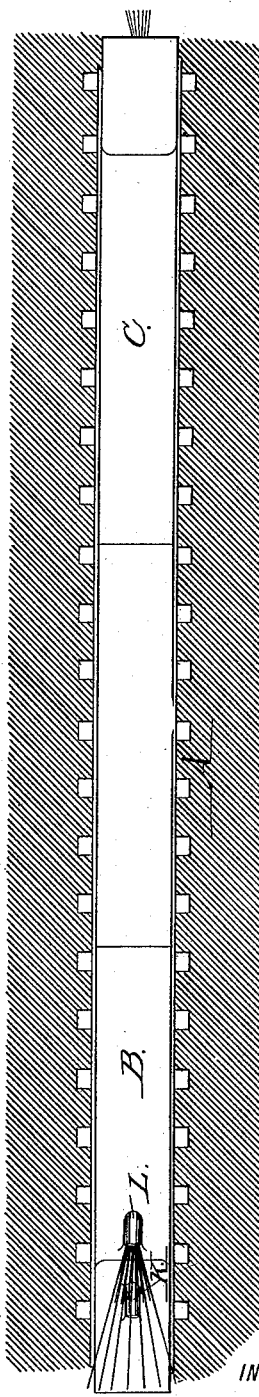
Figure 10:
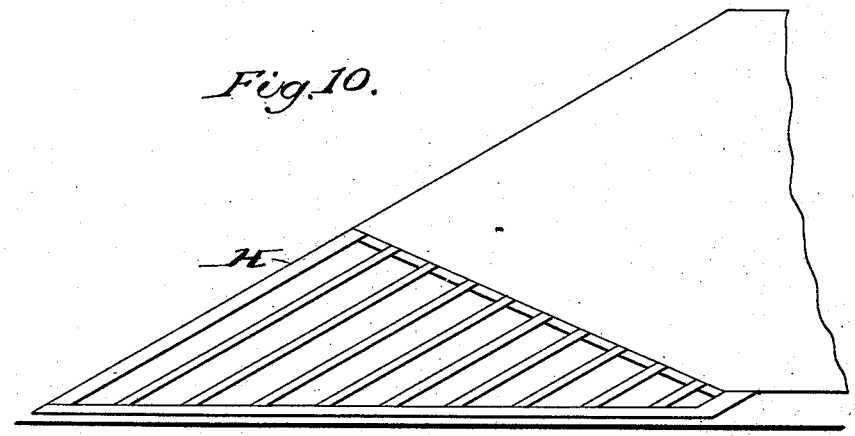
Figure 11:
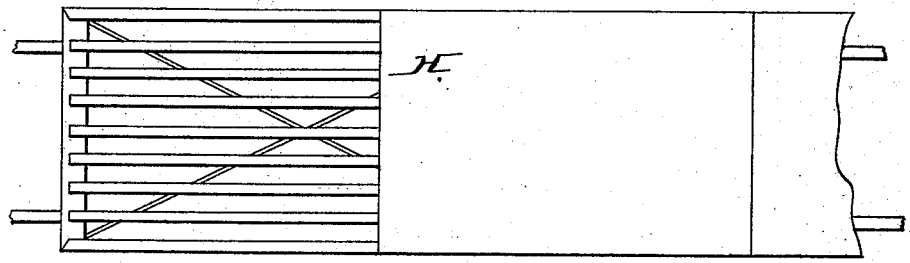

Figure 1 represents a train of vestibule-cars provided with an electric head-light and rear signal-light. Fig. 2 is a plan view of the same. Fig. 3 is an enlarged vertical sectional view of one of the cars. Fig. 4 is a horizontal sectional view of the same. Fig. 5 is a side elevation of the locomotive, showing a part of casing broken away to expose the motors, telegraph-key, and other instruments. Fig. 6 is a plan view of Fig. 5, showing the front portion in section. Fig. 7 is a detail showing the forward portion of the locomotive or forward car with its movable point or front. Fig. 8 is a sectional view of the same. Fig. 9 is an end view of Figs. 7 and 8. Fig. 10 is a side elevation of the cow-catcher. Fig. 11 is a plan view thereof. Fig. 12 is a perspective view showing a portion of the track with its main conductor, and also showing the secondary wire or conductor which connects with the telegraph-key and other instruments. Fig. 13 is a detail showing a transverse sectional view of the track, and showing the supplemental wheels or rollers for preventing the train jumping the track. Figs. 14 and 15 illustrate modified forms of rails.

My present invention relates to a system of railways for the rapid transportation of passengers by means of electricity, the main current of which is utilized to propel, heat, and light the train, a second current also being employed to operate in conjunction with complementary telegraph-instruments carried by the train; and my invention consists in the constructions and combinations of elements which together make up the system, and which I shall hereinafter fully describe and claim.

To enable others skilled in the art to make and use my invention, I will now describe its construction and indicate the manner in which the same is carried out.

Referring now to Figs. 1 and 2 of the drawings, A indicates a train of cars, which is herein shown as of the vestibule pattern, B designating the locomotive or front car, and C the rear car, the said front and rear car having a pointed end, as shown.

The main wheels D of the locomotive and succeeding cars are mounted upon axles $a'$, the ends of which turn in boxes $b$, mounted in semi-elliptical housings $c$, secured on the exterior of the cars, as shown in Figs. 5 and 6, the said housings being formed semi-elliptical to prevent the retardation of the train, which would be the case if they were of square form and projected beyond the sides of the train and thereby offered resistance to the air, as set forth more fully in an application for Letters Patent filed by me January 30, 1889, Serial No. 298,119.

The front car or locomotive may carry any desired number and style of motors E, with brushes, commutators, armatures, and other adjunctive parts of any well-known form, not herein necessary to show in detail, and said motors are connected in any suitable manner with a copper wire or main conductor $d$, laid upon the stringers beneath the rails, as shown in Figs. 12 to 15, inclusive, another wire or second conductor $e$ being also laid along the stringer in a housing $e'$, and being engaged by a brush $f$, carried by an arm $f'$, secured to the car or cars—preferably the front one or locomotive—and being electrically connected with the wires $g$ $g'$, leading to a telegraph-key F, as shown in Fig. 5, or to similar instruments, whereby messages may be transmitted from the moving train to distant points, the said main conductor being connected with one or more dynamos at the end of the line of road, as disclosed in my former patent, No. 376,567, dated January 17, 1888, and the second conductor being connected with any well-known source of electricity at the station or otherwise. The main rails in this case have an upper tread or surface $h$, upon which the main wheels D travel, and an outwardly-extending flange $h'$, which may extend inwardly, as shown in Figs. 12, 13, and 14, or outwardly, as shown in Fig. 15, these flanges being designed as tracks, against the under surface of which supplemental wheels G travel, to hold the train to the rails and to prevent the same leaving the track when traveling at a high rate of speed, the said supplemental wheels being mounted on shafts which are journaled to the body of the car in any well-known manner, as more fully disclosed in an application filed by me December 28, 1888, Serial No. 294,889.

The front car or locomotive may be provided with a cow-catcher H, (shown in Figs. 10 and 11,) having a square front and being located slightly above the main rails, and said front car or locomotive is provided with a movable point or front J, which has a hinge-connection $j$ with the body of the car or locomotive, as shown in Figs. 7, 8, and 9. This movable point or front is operated by a system of levers I within the car, near the engineer or operator, and is designed to be adjusted up and down when desired to cause the train to more closely hug the track. Thus in ascending a steep grade the point J will be slightly elevated above the position it occupied when the train was traveling on the level, and the air striking the upper incline of the point will hold the car to the track. This adjustable point and the supplemental wheels make it almost impossible for the train to leave the track even when it has obtained the greatest velocity.

The point or front J is provided with a glass-protected lookout K, by means of which the engineer or operator is permitted to view the track ahead, and the main portion of the car above the adjustable point is provided with an electric head-light L, the wires $k$ and $l$ of which, like those extending from the lights M and heaters N in Fig. 3, are in the main circuit and connected in any well-known manner with the main current, whereby said current furnishes the medium by which the lighting and heating of the train is accomplished.

The rear car of the train will have a pointed rear end provided at its apex with an electric light O, which is also connected with the main current in any well-known manner, and operates as the rear signal-light, as shown in Fig. 1.

From the foregoing it is obvious that the system described and illustrated is capable of a high rate of speed with perfect safety, the possibility of derailment being reduced to a minimum, and the train illuminated and heated by the current which propels the cars, the head-light and signals being also in the circuit, and the telegraph or other instruments for conveying messages between the train and distant points being on a second circuit. It will also be observed that the adjustability of the point or front of the forward car and the fact that the train, being of what is known as the "vestibule" pattern, has no outward projections, but little resistance is offered to the air; consequently a maximum speed is obtained at a minimum of power.

Having thus described my invention, what I claim as new, and desire to secure by Letters Patent, is—

1. In an electric-railway system for passenger traffic, in which a train of cars is propelled, lighted, and heated by a current from an electric rail, a locomotive or carrier having a pointed end and head-light, and a rear car having a pointed end, the apex of which is provided with a signal-light, both the head-light and signal being in the main circuit and lighted thereby, substantially as herein described.

2. In an electric-railway system for passenger traffic, in which a train of cars is propelled, lighted, and heated by a current from an electric rail, a head-light and rear signal-light in said circuit and lighted thereby, and an independent conductor conveying a second current to telegraphic or other instruments on the train, substantially as herein described.

3. In an electric-railway system operated by a current from an electric rail, a locomotive or carrier having a point or front capable of movement in vertical planes, substantially as described.

4. In an electric-railway system operated by a current from an electric rail, a locomotive or carrier having a pointed end or front hinged or jointed to the body thereof and movable about its joint, whereby said point may be adjusted, substantially as herein described.

5. In an electric-railway system operated by a current from an electric rail, a locomotive or carrier having its pointed front or end hinged to the body portion, and a system of levers connected with said movable point or front, whereby the latter is adjusted, substantially as described.

6. In an electric-railway system operated by a current from an electric rail, a locomotive having a pointed front end, a rear car having a pointed rear end, and a signal-light in the apex of the pointed rear end, substantially as herein described.

7. In an electric-railway system operated by a current from an electric rail, a locomotive having an adjustable front or point provided with a "lookout," substantially as and for the purpose described.

8. In an electric-railway system, a car or carrier having its rear end pointed and having in the apex thereof a signal-light, substantially as described.

9. An electric system for passenger traffic comprising the following instrumentalities, to wit: a train of cars, the locomotive and rear car having a pointed end, as described, said locomotive carrying a motor, a main conductor conveying an electric current to the motor and propelling, heating, and lighting the cars, signals in the main circuit, and telegraphic instruments in a second circuit, substantially as herein described.

DAVID G. WEEMS.

Witnesses:
W. H. PATTERSON,
T. WALTER FOWLER.